United States Patent [19]
Coelho et al.

[11] Patent Number: 4,803,842
[45] Date of Patent: Feb. 14, 1989

[54] DIRECT CONTACT COOLING OF FOODSTUFFS WITH HALOCARBON HEAT TRANSFER LIQUIDS

[75] Inventors: Philip H. Coelho; Victor Comerchero, both of Folsom, Calif.

[73] Assignee: Castleton, Inc., Rancho Cordova, Calif.

[21] Appl. No.: 12,197

[22] Filed: Feb. 9, 1987

[51] Int. Cl.$^4$ ............................................. F25D 17/02
[52] U.S. Cl. ......................................... 62/64; 62/114; 252/67
[58] Field of Search ...................... 62/64, 114; 252/67

[56] References Cited

U.S. PATENT DOCUMENTS

| | | | |
|---|---|---|---|
| 2,841,965 | 7/1958 | Etherington | 62/513 |
| 3,576,650 | 4/1971 | Underwood et al. | 62/60 |
| 3,603,102 | 9/1971 | Banas | 62/64 |
| 3,729,947 | 5/1973 | Higuchi | 62/60 |
| 4,002,573 | 1/1977 | Hutchinson | 62/114 |
| 4,019,992 | 4/1977 | Kruger | 252/67 |
| 4,057,973 | 11/1977 | Murphy et al. | 62/114 |
| 4,057,974 | 11/1977 | Murphy et al. | 62/114 |
| 4,149,016 | 4/1979 | Toy et al. | 252/67 |
| 4,465,610 | 8/1984 | Enjo et al. | 252/67 |
| 4,680,939 | 7/1987 | Rojey et al. | 62/114 |

*Primary Examiner*—Ronald C. Capossela

[57] ABSTRACT

Direct contact cooling or freezing of foodstuffs immersed in or sprayed with a low freezing temperature liquid preferably comprising a mixture of a chlorofluorocarbon (CFC 113) and perfluorohexane ($C_6F_{14}$) minimizes migration of toxins in the heat transfer liquid to the foodstuffs.

11 Claims, No Drawings

DIRECT CONTACT COOLING OF FOODSTUFFS WITH HALOCARBON HEAT TRANSFER LIQUIDS

BACKGROUND OF THE INVENTION

The present invention relates to the art of direct contact cooling or freezing of articles and, more particularly, to the direct contact cooling or freezing of articles in which contamination of the article by migration to the article of toxins in the heat transfer fluid must be avoided. Such is particularly the case when the articles to be chilled or frozen are intended for human or animal consumption such as foods or dietary supplements.

THE PRIOR ART

Direct contact heat transfer liquids such as liquid nitrogen and liquid carbon dioxide are well known and are used in extremely low temperature applications such as cryogenic freezing which requires expensive equipment to maintain the liquid state of the coolant by the proper combination of pressure and low temperature to prevent evaporation and consequent loss of the vapor to atmosphere. Since there is a direct relationship between frozen food that tastes fresh and the rate at which the food is frozen, some of the more expensive foods are cryogenically frozen with liquid nitrogen, etc. despite the high freezing costs. However, for the economical freezing of less sensitive foodstuffs, the extreme low temperatures of liquid nitrogen and liquid carbon dioxide and attendant expense of the specialized equipment to handle it are not deemed cost effective.

Most conventional prior art food freezers comprise open air refrigeration units in which the heat transfer fluid is air. Although it is well known that liquids are more efficient than gases as heat transfer fluids, when freezing or chilling foodstuffs and the like, direct contact with the heat transfer fluid is acceptable only if the fluid is substantially non-toxic and/or has tolerable levels of migration of toxins to food. Air or sometimes water is thus used for cooling of foodstuffs.

As will be seen below, complex refrigeration apparatus for use in handling the direct contact heat transfer liquids disclosed herein is not required nor is any particular type of chiller needed; however, suitable apparatus for immersion or spray contact of the articles to be frozen or chilled are shown in co-pending applications Ser. Nos. 648,066 filed Sept. 7, 1984, now abandoned and 651,674 filed Sept. 18, 1984 now abandoned, inventory Terry Wolf.

Chlorofluorocarbon refrigerants such as the Freon (trademark of the Dupont Company) compositions have previously been employed in closed loop non-direct contact refrigeration systems in which the circulating refrigerant is never permitted to come into direct contact with the articles to be chilled. Toxins present in refrigerants of this type have, with one exception noted below, prevented these refrigerants from being approved by regulatory authorities such as the United States Food and Drug Administration (FDA) for direct contact with food stuffs.

To date it is believed that only one chlorofluorocarbon, Freon 12, (dichlorodifluoromethane) has ever been approved by the FDA for direct contact with human food. This composition is, however, only marginally suitable for use in immersion or spray contact freezing of foodstuffs because of its relatively low boiling point ($-30°$ C.) which results in the loss of product to atmosphere despite expensive recovery systems and the consequent expense of regular replacement of lost fluid. A suitable direct contact heat transfer liquid must therefore also have a suitably high boiling point above normal ambient temperatures, preferably above 50° C., in order to maintain tolerable losses due to evaporation.

DETAILED DESCRIPTION OF THE INVENTION

For the purposes intended, a suitable heat transfer liquid preferably will have all of the following properties:

(a) a freezing point sufficiently below 0° C. so that articles to be chilled or frozen can be immersed in a liquid bath for the minimum amount of time to achieve the desired temperature reduction;

(b) a boiling point preferably above 50° C. so that undue loss of heat transfer fluid to atmosphere through evaporation does not take place;

(c) be essentially colorless, odorless, nonflammable, and be substantially non-toxic or be of such a nature that toxins present do not readily migrate to foodstuffs or other articles during the time of direct contact therewith;

(d) have good thermal conductivity;

(e) have a low viscosity and low surface tension so that excess liquid will readily drain off of frozen or chilled product as it is removed from the liquid; and (f) be immiscible in water so that any unwanted water in the heat transfer liquid can easily be removed to prevent ice build up.

Tests have been performed using the chlorofluorocarbon (CFC) composition sold under the Freon 113 trademark alone and with the addition of various amounts of $C_6F_{14}$ as direct contact heat transfer liquids so as to determine the degree of migration of contaminant toxins from the heat transfer liquid to the product being cooled. The test results are summarized in Table I. As seen therein, it has been determined that the above objectives can be attained by a heat transfer liquid comprising the chlorofluorocarbon 1,1,2 trichloro-1,2,2 trifluoro-ethane (Freon 113), herein referred to as CFC 113, or mixtures thereof with various amounts of the fluorocarbon perfluorohexane ($C_6F_{14}$), or other chemically similar fluorocarbons including perfluoropentane ($C_5F_{12}$), perfluoromethylcyclohexane ($C_7F_{14}$), perfluoroheptane ($C_7F_{16}$), perfluoromonomethyldimethylcyclohexanes ($C_7F_{14}/C_8F_{16}$), perfluorodecalin isomers ($C_1F_{18}$), mixed perfluorodecalin and methyldecalin isomers ($C_{10}F_{18}+C_{11}F_{20}$), and perfluorinated polyethers ($[OCF(CF_3)CF_2]_n$-$(OCF_2)_m$). These fluorocarbons are all commercially available fluorinated hydrocarbons sold under the FLUTEC trademark by ICS Chemicals Limited. A particularly suitable composition comprises a mixture of from 0.5% to 2.0% by weight of perfluorohexane ($C_6F_{14}$) and the remainder CFC 113 (1,1,2 trichloro 1,2,2 trifluoro ethane) with the surprising result of a substantial reduction in the amounts of toxins which migrated to foodstuffs or other products immersed in the liquid mixture.

The tests performed for which the results are summarized in Table I are set forth in the following Examples.

EXAMPLE 1

Freezing Temperature Migration to Blotted Dry Shrimp Exposed to Direct Contact with CFC 113

Raw shrimp each weighing approximately 4 grams were first removed from a tank of water, blotted dry and and were then immersed for 3 minutes in a liquid bath of commercially pure CFC 113 maintained at a temperature of $-30°$ C. The shrimp were found to be completely frozen when removed from the bath.

The shrimp were then removed from the CFC 113 bath and allowed to set for 3 minutes to permit residual CFC 113 to drain off of the shrimp before testing for migration or the CFC 113 to the shrimp. Gas chromatography testing revealed a residue of about 600 parts per million (ppm) of CFC 113 in the raw shrimp.

EXAMPLE 2

Freezing Temperature Migration to Blotted Dry Shrimp Exposed to Direct Contact with 99/1 by Weight Mixture of CFC 113 and $C_6F_{14}$ The process of Example 1 was followed with the exception that the shrimp were immersed for 3 minutes in a bath comprising a liquid mixture of 99 parts by weight of CFC 113 and 1 part by weight of $C_6F_{14}$ maintained at a temperature of $-30°$ C. The removed shrimp were completely frozen.

Substantial reduction in the amount of CFC 113 present in the shrimp to about 450 ppm is experienced.

EXAMPLE 3

Freezing Temperature Migration to Dry Shrimp Exposed to Direct Contact with 95/5 by Weight Mixture of CFC 113 and $C_6F_{14}$ The process of Example 1 was repeated using the mixture composition set forth above. The test results showed a migration of about 390 ppm of CFC 113 to the shrimp.

EXAMPLE 4

Freezing Temperature Migration to Dry Shrimp Exposed to Direct Contact with 99.5/0.5 weight Mixture of CFC 113 and $C_6F_{14}$ The process of Example 1 was again repeated using the mixture composition set forth above. The test results showed a migration of about 460 ppm of CFC 113 to the dry shrimp.

EXAMPLE 5

Freezing Temperature Migration to Wet Shrimp Exposed to Direct Contact with CFC 113

The process of Example 1 was performed with the exception that the shrimp were not blotted dry to remove residual water therefrom prior to immersion into the CFC 113. The purpose was to determine the effect, if any, of allowing some water to remain on the shrimp during the freezing process. The expected ice barrier on the shrimp caused by the freezing of the water in the CFC 113 bath resulted in approximately 300 ppm of residual CFC 113 in the shrimp. There is effectively about a 50% reduction to be expected in CFC 113 residuals in the shrimp if wet rather than dry shrimp are frozen in the CFC 113 bath.

EXAMPLE 6

Freezing Temperature Migration to Wet Shrimp Exposed to 99/1 by Weight Mixture of CFC 113 and $C_6F_{14}$ The process of Example 3 was repeated with the only change comprising the use of a freezing bath identical with that used in Example 2. Approximately 150 ppm of CFC 113 were found to have migrated to the wet frozen shrimp as compared with the approximately 450 ppm which migrated to the dry shrimp as shown in Example 2. This constitutes a 67% reduction to be expected when wet instead of dry shrimp are frozen in a 99/1 wt. mixture as set forth above.

EXAMPLE 7

Freezing Temperature Migration to Wet Shrimp Exposed to Direct Contact with 95/5 by Weight Mixture of CFC 113 and $C_6F_{14}$ The process of Example 4 was followed with the exception that the proportions of the freezing bath components were changed to 95/5 weight percent to determine the effect, if any, of slight increases in the proportion of $C_6F_{14}$ present in the bath. Residual CFC 113 present in the shrimp was about 100 ppm.

EXAMPLE 8

Freezing Temperature Migration to Wet Shrimp Exposed to Direct Contact with 99.5/0.5 by Weight Mixture of CFC 113 and $C_6F_{14}$ The process of Example 4 was followed with the exception that the proportions of the freezing bath components were changed to 99.5/0.5 weight percent to determine the effect, if any, of slight decreases in the proportion of $C_6F_{14}$ present in the bath. Residual CFC 113 present in the shrimp was about 200 ppm.

In all of the above Examples, no significant detectable amounts of $C_6F_{14}$ were found in the shrimp.

It has been further discovered that cooking of raw shrimp frozen in accordance with the processes disclosed in the above Examples 8 in boiling water for 3 minutes resulted in further reduction in the residual CFC 113 in the shrimp to levels of about 100 ppm for the frozen shrimp of Example 1; of about 60 ppm for the shrimp of Example 2; of about 60 ppm for the shrimp of Example 3; of about 10 ppm for the shrimp of Example 4; of about 3 ppm for the shrimp of Example 5; and about 18 ppm for the shrimp of Example 6.

The relatively high vapor pressures of CFC 113 and $C_6F_{14}$ and the mixtures of these compositions disclosed in the above Examples is important in further reducing the residual levels of the freezing bath toxins in the food and also reducing the losses to evaporation of the bath components from the freezer. A recovery system that places the frozen food under vaccuum or negative pressure, even briefly, reduces the amounts of the CFC 113 retained on the shrimp by about 50% as compared with the amounts retained when the freezing is conducted under atmospheric conditions. This recovered CFC 113 can then be returned to the freezing bath.

From the foregoing description it will be seen that the chlorofluorocarbon CFC 113 and mixture of small amounts ranging from 0.5-5.0 volume percent of certain fluorocarbons, particularly $C_6F_{14}$, therewith results in compositions having properties which render them particularly suitable as a heat transfer liquid for direct contact with foodstuffs and other products intended for human or veterinary use. Careful control of the mixed amounts of $C_6F_{14}$ enables variation of the freezing point of the heat transfer liquid so that the time of the freezing process can easily be reduced when desired by using a liquid with a suitably low freezing point and maintaining the liquid temperature near said freezing point while immersion or spray contacting foodstuffs therewith. Improvments result when the foodstuffs are wet rather than dry before contact with the freezing bath since it is postulated that the ice layer formed by the water on the surface of the foodstuff acts as a barrier to the migration of toxins from the liquid freezing bath. Cooking of the foodstuff further reduces the toxin concentration, apparantly due to evaporation of the toxins from the foodstuff at the high temperatures encountered in the cooking process.

It will be appreciated that the chilling or freezing of foodstuffs in thin wall containers such as cans or plastic bags or the like having negligible heat retention in the container walls is contemplated by the present invention in addition to the direct contact of foodstuffs by the liquid heat transfer fluids disclosed herein.

TABLE I

| | Substance | Freezing Temp. | Boiling Temp. | Migration to Shrimp | | Residual After Cooking | |
|---|---|---|---|---|---|---|---|
| | | | | Dry | Wet | Dry | Wet |
| (1) | CFC 113 | −35° C. | 47.6° C. | 590 ± 10 ppm | 300 ± 10 ppm | 100 ppm | 60 ± 5 ppm |
| (2) | 99 Parts (WT.) CFC 113<br>1 Part (WT.) $C_6F_{14}$ | −36° C. | 48.1° C. | 450 ± 10 ppm | 145 ± 10 ppm | 60 ppm | 10 ± 2 ppm |
| (3) | 95 Parts (WT.) CFC 113<br>5 Parts (WT.) $C_6F_{14}$ | −39° C. | 49.1° C. | 390 ± 10 ppm | 100 ppm | | 3 ± 2 ppm |
| (4) | 99.5 Parts (WT.) CFC 113<br>0.5 Parts (WT.) $C_6F_{14}$ | −36° C. | 47.9° C. | 460 ± 10 ppm | 190 ± 10 ppm | | 8 ± 2 ppm |

We claim:

1. A process of chilling articles comprising the steps of exposing said articles to direct contact with a heat transfer liquid selected from the group consisting of the chlorofluorocarbon 1,1,2 trichloro-1,2,2 trifluoro-ethane (Freon 113), and the fluorocarbons perfluoropentane ($C_5F_{12}$), perfluorohexane ($C_6F_{14}$), perfluoromethylcyclohexane ($C_7F_{14}$), perfluoroheptane ($C_7F_{16}$), perfluoromonomethyldimethylcyclohexanes ($C_7F_{14}/C_8F_{16}$), perfluorodecalin isomers ($C_{10}F_{18}$), mixed perfluorodecalin and methyldecalin isomers ($C_{10}F_{18}+C_{11}F_{20}$), and perfluorinated polyethers ($[OCF(CF_3)CF_2]_n$-$(OCF_2)_m$ or mixtures of said chlorofluorocarbon with at least one of said fluorocarbons, maintaining said liquid at a temperature, sufficiently low enough to cool said articles to the desired temperature in the desired amount of time.

2. The process of claim 1, wherein said articles are exposed to direct contact with said heat transfer liquid by immersing said articles in a bath of said liquid.

3. The process of claim 1, wherein said articles are exposed to direct contact with a continuous flow of heat transfer liquid over the surface of said articles.

4. The process of claim 1, wherein said heat transfer liquid is a mixture of said chlorofluorocarbon and perfluorohexane.

5. The process of claim 4, wherein said heat transfer liquid comprises from 0.5 to 5.0 percent by weight of perfluorohexane.

6. The process of claim 4, wherein said heat transfer liquid comprises from 0.5 to 1.5 percent by weight of perfluorohexane.

7. The process of any one of the preceding claims, wherein said articles are intended for internal consumption by humans or animals.

8. A heat transfer liquid selected from the group consisting of the chlorofluorocarbon 1,1,2 trichloro-1,2,2 trifluoro-ethane (Freon 113), and the fluorocarbons perfluoropentane ($C_5F_{12}$), perfluorohexane ($C_6F_{14}$), perfluoromethylcyclohexane ($C_7F_{14}$), perfluoroheptane ($C_7F_{16}$), perfluoromonomethyldimethylcyclohexanes ($C_7F_{14}/C_8F_{16}$), perfluorodecalin isomers ($C_1F_{18}$), perfluorodecalin and methyldecalin isomers ($C_{10}F_{18}+C_{11}F_{20}$), and perfluorinated polyethers, or mixtures of said chlorofluorocarbon with one of said fluorocarbons.

9. A heat transfer liquid according to claim 8, comprising a mixture of said chlorofluorocarbon and perfluorohexane.

10. A heat transfer liquid according to claim 9, wherein said perfluorohexane is present in an amount ranging from 0.5 to 5.0 percent by weight.

11. A heat transfer liquid according to claim 10, wherein said perfluorohexane is present in an amount ranging from 0.5 to 1.5 percent by weight.

* * * * *